(12) United States Patent
Lai et al.

(10) Patent No.: US 7,177,655 B2
(45) Date of Patent: Feb. 13, 2007

(54) METHOD OF INSTANTLY RECEIVING AND PLAYING BACK AUDIO DATA FROM WIRELESS NETWORK BY WIRELESS TERMINAL

(75) Inventors: Shing Cheng Lai, Taipei Hsien (TW); Yu Hong Duan, Nanking (CN); Long Xiao Fan, Nanking (CN)

(73) Assignee: Inventec Appliances Corp., Taipei Hsien (TW)

( * ) Notice: Subject to any disclaimer, the term of this patent is extended or adjusted under 35 U.S.C. 154(b) by 875 days.

(21) Appl. No.: 10/394,251

(22) Filed: Mar. 24, 2003

(65) Prior Publication Data

US 2004/0192358 A1    Sep. 30, 2004

(51) Int. Cl.
*H04Q 7/20* (2006.01)
*H04M 1/64* (2006.01)

(52) U.S. Cl. ............... 455/466; 455/456.6; 379/67; 379/67.1

(58) Field of Classification Search ........... 455/466; 379/67, 67.1
See application file for complete search history.

(56) References Cited

U.S. PATENT DOCUMENTS

| | | | |
|---|---|---|---|
| 6,987,980 B1* | 1/2006 | Hans et al. | 455/466 |
| 2004/0048622 A1* | 3/2004 | Witkowski et al. | 455/456.6 |
| 2006/0135186 A1* | 6/2006 | Hans et al. | 455/466 |

* cited by examiner

*Primary Examiner*—Wing Chan
*Assistant Examiner*—Thjuan P Knowlin
(74) *Attorney, Agent, or Firm*—Bacon & Thomas, PLLC

(57) ABSTRACT

The present invention discloses a method of using a wireless terminal to instantly receive and play back an audio data from a wireless network server without requiring the user to download and save the audio data into the wireless terminal first. When the wireless terminal requests the wireless network server to download an audio data, the wireless network server divides the audio data into a several batches of data according to the request of the wireless network server. The batches of data are sequentially downloaded to a voice download buffer of the wireless terminal, and then sequentially sent to a voice playback buffer of the wireless terminal after each batch of data is decoded. Thus, achieving the function of immediately and continuously play back the audio data online through the wireless terminal.

9 Claims, 3 Drawing Sheets

METHOD OF INSTANTLY RECEIVING AND PLAYING BACK AUDIO DATA FROM WIRELESS NETWORK BY WIRELESS TERMINAL

BACKGROUND OF THE INVENTION

1. Field of the Invention

The present invention relates to a method of using a wireless terminal to instantly receive and play back an audio data through a wireless network.

2. Description of the Related Art

This is a world of information technology and an era of blooming electronic industry, in which the fast development of high-tech products and electronic equipment derived from computers definitely brings convenience to our daily life. However, as all kinds of electronic technologies undergo a constant research and development and progress, people have relatively high demand on the application of consumer electronic products, particularly the popular use of wireless terminals (such as a mobile phone), so that the major handset manufacturers in the world unceasingly conduct research and development on their mobile phones and related products and provide more convenient, efficient and humanistic services to consumers. Such research and development has become one of the important indexes for evaluating the sales performance and manufacturing technology of major handset manufacturers and determine whether or not they lead far ahead the industry.

There are some mobile phones in the market capable of playing back an audio file in music format, and its main playback mechanism is to download and save an audio file in MP3 format from a remote server to a mobile phone via wireless or a cable, and then use the mobile phone to play back such audio file. Although such doing makes the mobile phone application more diversified, it takes time to download the audio file and lots of memory spaces of the mobile phone to save the audio file.

In summation of the above description, every handset manufacturer not only maintains its manufacturing quality, but also needs to improve the diversified application of the product in order to cope with the extensive mobile phone demand. The humanistic and diversified design becomes the mainstream of the development. Therefore, it is good to have a method for directly listening to the content of such audio file online without requiring the mobile phone user to download and save such audio file first. For example, the mobile phone is used to play back a news, weather forecast, or a speech addressed by a famous person directly. Such design concept creates a win-win situation for both of the consumers and handset manufacturers.

In view of some of the current wireless terminals in the market (such as the WAP mobile phone), they can be used to play back the audio data (such as music, instant news, and stock analysis). The main playback and receiving way is to download the compatible audio data from a server to the wireless terminal first. After such audio data is decoded, the wireless terminal can be used to play back such audio data. Although such doing can make the wireless terminal application more diversified, it takes time to download the audio file and lots of memory space of the mobile phone to save the audio file. Furthermore, the competition between wireless terminal manufacturers is severe. Therefore, any considerate design benefiting consumers may be the key factor of the success in sales performance. To overcome the shortcomings of the prior art, the inventor conducted extensive studies and experiments, and finally invented a method of using a wireless terminal to directly receiving and playing back the audio data from the wireless network in accordance with the present invention.

SUMMARY OF THE INVENTION

The primary objective of the present invention is to provide a method for directly listening to the content of the audio data such as the information of news, weather forecast, and speech by a famous person, etc. without requiring the wireless terminal user to download and save the audio data first. Such method mainly enables the wireless network server to collect various audio information at regular time, and convert such audio information save them as the audio data compatible to the wireless terminal. When the wireless terminal requests the wireless network server to download a certain audio data, such wireless network server divides such audio data into a first batch of data, a second batch of data, and so on according to the request of the wireless network server. The first batch of data is downloaded to a voice download buffer of such wireless terminal, and then sent to a voice playback buffer of such wireless terminal after the first batch of data is decoded. If the quantity of data of the first batch in the voice download buffer is less than a predetermined value, then the wireless terminal will continue to download the second batch of data from the wireless network server, and then repeat the foregoing steps, and thus achieving the function of immediately and continuously play back the audio data online through the wireless terminal.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
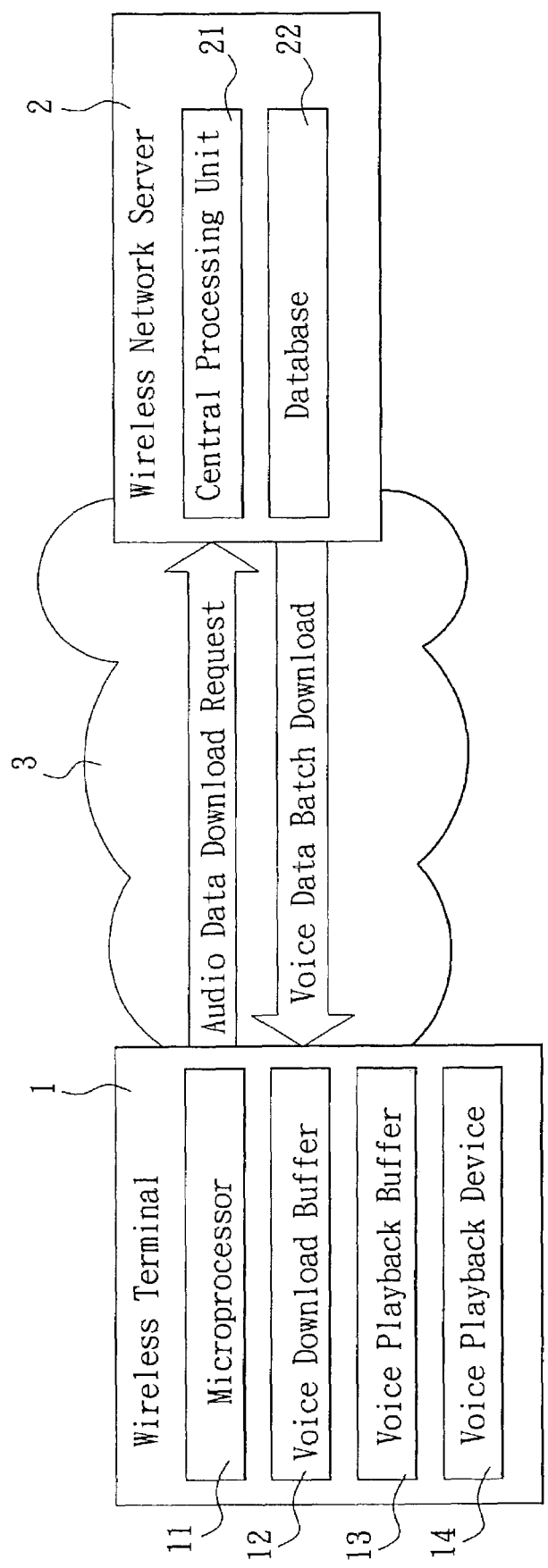
FIG. 1 is an illustrative diagram of the present invention.

Please refer to the FIG. 1 for a method of instantly receiving and playing back audio data from wireless network by wireless terminal. Such method is applied to a wireless terminal 1 (such as a mobile phone or a personal digital assistant), a wireless network server 2, and a wireless network 3 between the two; wherein the wireless network server 2 can collect and produce various audio message at regular time, and convert and save such audio information into an audio data readable by such wireless terminal 1. When the wireless terminal 1 requests the wireless network server 2 to download an audio data (such as a speech, weather forecast, instant news, and stock analysis, etc.) via such wireless network 3, such wireless network server 2 can divide such audio data into a plurality of small files, and send such files to the wireless terminal 1 by batches one at a time, so that the wireless terminal 1 will automatically decode and play back the received audio data after receiving a specific quantity of audio data.

Please refer to FIG. 1 for the present invention. The wireless terminal 1 comprises a microprocessor 11, a voice download buffer 12, a voice playback buffer 13, and a voice playback device 14. When such wireless terminal 1 receives an instruction for downloading a certain type of audio data (such a broadcasting, speech, weather forecast, instant news, stock analysis, and today's luck, etc.), such microprocessor 11 will request the wireless network server 2 through the wireless network 3 to download the audio data to the voice download buffer 12. As soon as the quantity of audio data reaches the predetermined value (the predetermined value can be set according to actual need and situation), the microprocessor 11 will start decoding the received audio data, and send the decoded audio data to the voice playback buffer 13 for storage. The microprocessor 11 starts the voice playback device 14 such that the voice playback device 14 can access and play the audio data from the voice playback buffer 13, while making the voice playback buffer 13 to release the memory space. Then, the microprocessor 11 determines whether such voice download buffer 12 still has space; if yes, then it will continue to download the audio data into the voice download buffer 12 and then determines whether such voice playback buffer 13 still has space; if yes, then it will continue to send the decoded audio data to the voice playback buffer 13, so that the voice playback device 14 can continue to access and play back the audio data from the voice playback buffer 13.

Please refer to FIG. 1 for the present invention again. When the wireless terminal 1 uses the voice playback device 14 to access and play the audio data from the voice playback buffer 13, and after the voice playback buffer 13 releases the memory space, then if the microprocessor 11 determines that the voice download buffer 12 has no more space, then it will determine if the voice playback buffer 13 still has memory space.

Please refer to FIG. 1 for the present invention again. When the audio data has been downloaded to the voice download buffer 12 and played back and if the microprocessor 11 determines that the voice playback buffer 13 no longer has memory space, then the voice playback device 14 is used to access and play the audio data from the voice playback buffer 13, so that the voice playback buffer 13 can release the memory spaces.

By means of the present invention, if a user wants to use such wireless terminal 1 to listen to an instant news, the user no longer needs to waste time to download such instant news of audio data format in advance or waste lots of memory spaces to save such audio data format to immediately listen to the content of the instant news online. In addition, the microprocessor 11 constantly determines if there is still any memory space remained in the voice playback buffer 13 and the voice download buffer 12, so that the downloaded audio data will not occupy too many memory spaces of the wireless terminal 1, but be decoded and played back at appropriate time. The content of such instant news can be timely and uninterruptedly played back online.

Figure 2:
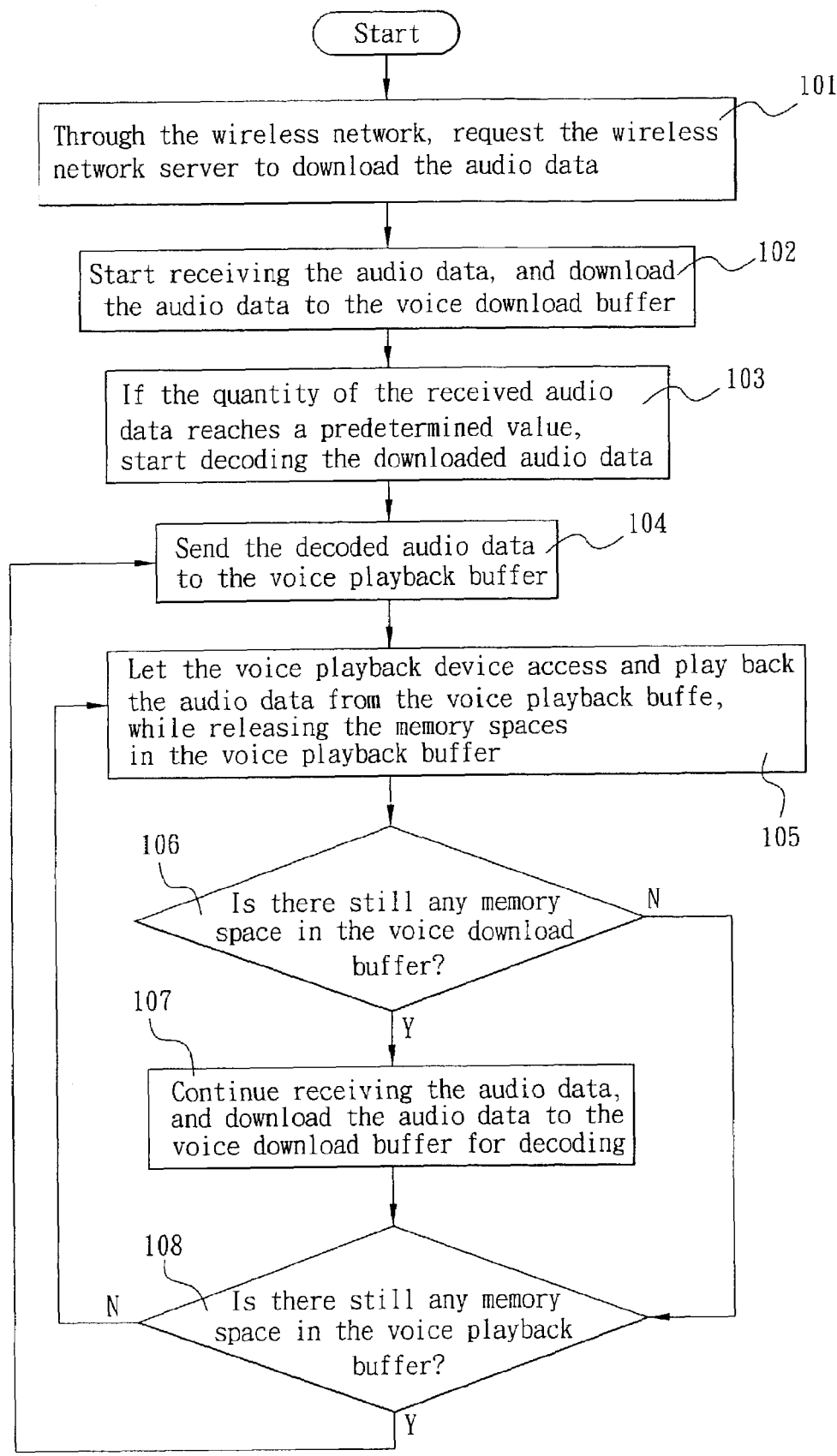
FIG. 2 is a flow chart of the actions of the wireless terminal according to the present invention.
Figure 3:
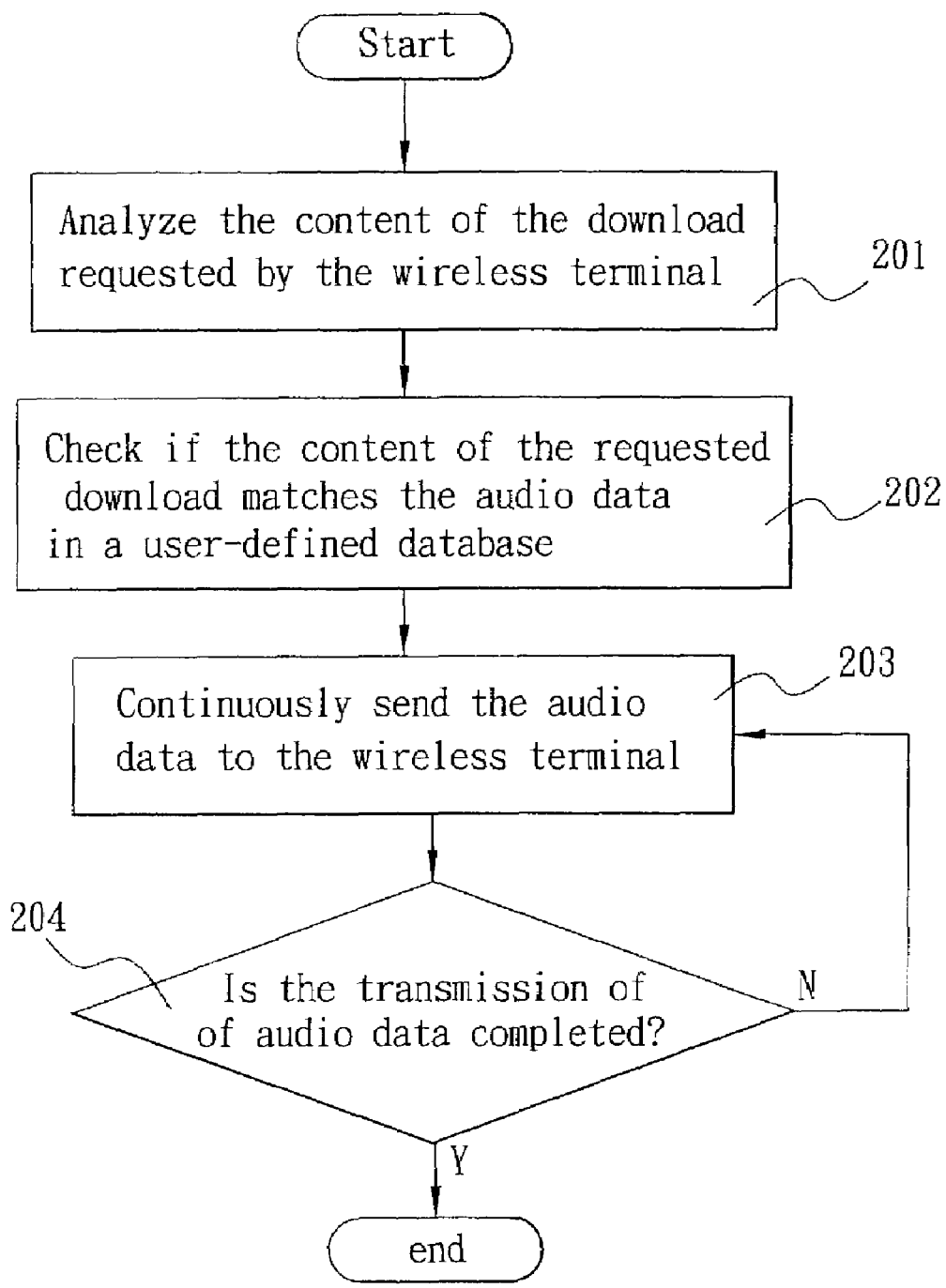
FIG. 3 is a flow chart of the actions of the wireless network server according to the present invention.

To make it easier for our examiner to understand the way of downloading the audio data and the playback mechanism, the following example is used. Please refer to FIGS. 1 and 2. After the wireless terminal 1 has received an instruction to play back a certain type of audio data, the microprocessor 11 determines and processes the instruction, and the procedure how the microprocessor 11 determines and processes the instruction (as shown in FIG. 2) is described below in details:

Step 101: Through the wireless network 3, request the wireless network server to download that type of audio data;

Step 102: Start receiving such audio data, and download the audio data to the voice download buffer 12;

Step 103: If the quantity of the received audio data reaches a predetermined value, start decoding the downloaded audio data;

Step 104: Send the decoded audio data to the voice playback buffer 13;

Step 105: Let the voice playback device 14 access and play the audio data from the voice playback buffer 13, while releasing the memory spaces in the voice playback buffer 13;

Step 106: Determine if there is still any memory space in the voice download buffer 12; if yes, execute the next step (Step 107), or else execute Step 108;

Step 107: Continue receiving the audio data, and download the audio data to the voice download buffer 12 for decoding;

Step 108: Determine if there is still any memory space in the voice playback buffer 13; if yes, then execute Step 104; if no, then execute Step 105;

Please refer to FIGS. 1, 2, and 3 for the present invention. When the wireless terminal 1 requests the wireless network server 2 to download the chosen audio data, the Central Processing Unit 21 of the wireless network server 2 will process the data according to the following procedure (as shown in FIG. 3):

Step 201: Analyze the content of the download requested by the wireless terminal 1;

Step 202: Check if the content of the requested download matches the audio data in a user-defined database 22;

Step 203: Continuously send the audio data to the wireless terminal 1;

Step 204: Determine if the transmission of audio data is completed; if yes, then end the procedure; if not, then repeat Step 203.

While the invention herein disclosed has been described by means of specific embodiments, numerous modifications and variations could be made thereto by those skilled in the art without departing from the scope and spirit of the invention set forth in the claims.

What is claimed is:

1. A method of instantly receiving and playing back audio data from wireless network by wireless terminal, being applied to a wireless terminal, a wireless network server, and a wireless network thereon; said wireless network server at regular time collecting and producing various voice information and converting and saving the voice information into an audio data readable by said wireless terminal; said wireless terminal comprising a microprocessor, a voice download buffer, a voice playback buffer, and a voice playback device; if said wireless terminal receiving a request to download a certain type of audio data from said wireless network server, the method comprising the steps of:

requesting said wireless network server to download said type of audio data through said wireless network;

starting to receive said audio data and downloading said audio data to said voice download buffer;

decoding the downloaded audio data if the quantity of received audio data reaching a predetermined value;

sending the decoded audio data to said voice playback buffer;

enabling said voice playback device to access and play back said audio data from said voice playback buffer, and releasing memory space in said voice playback buffer;

determining whether or not said voice download buffer still having any memory space; if yes, then continuing to download said audio data to said voice download buffer for decoding;

determining whether or not said voice playback buffer still having any memory space; if yes, then sending said decoded audio data to said voice playback buffer and using said voice playback device to access and play back said audio data from said voice playback buffer.

2. The method of instantly receiving and playing back audio data from wireless network by wireless terminal of claim 1, wherein said wireless terminal uses said voice playback device to access and play back said audio data from said voice playback buffer, while releasing memory space from said voice playback buffer; if said microprocessor determines that said voice download buffer no longer has memory space, then said microprocessor continues to determine whether said voice playback buffer still has memory space.

3. The method of instantly receiving and playing back audio data from wireless network by wireless terminal of claim 1, wherein said audio data is downloaded from said voice download buffer and played back; if said microprocessor determines that said voice download buffer no longer has memory space, then said voice playback device is used to access and play back said audio data from said voice playback buffer such that said voice playback buffer releases memory space.

4. The method of instantly receiving and playing back audio data from wireless network by wireless terminal of claim 1, wherein said wireless terminal requests said wireless network server to download a chosen audio data, and the procedure carried out by said microprocessor of said wireless network server comprising the steps of:

analyzing the content of the download requested by said wireless terminal;

checking if the content of the requested download matching the audio data in a user-defined database;

continuously sending said audio data to said wireless terminal;

determining whether the transmission of said audio data is completed; if yes, then end the procedure.

5. The method of instantly receiving and playing back audio data from wireless network by wireless terminal of claim 4, wherein said microprocessor determines whether the transmission of audio data is completed, and then continues sending said audio data to said wireless terminal, and determines whether the transmission of said audio data is completed again.

6. The method of instantly receiving and playing back audio data from wireless network by wireless terminal of claim 1, wherein said audio data is a song.

7. The method of instantly receiving and playing back audio data from wireless network by wireless terminal of claim 1, wherein said audio data is a news.

8. The method of instantly receiving and playing back audio data from wireless network by wireless terminal of claim 1, wherein said audio data is a weather forecast.

9. The method of instantly receiving and playing back audio data from wireless network by wireless terminal of claim 1, wherein said wireless terminal is a mobile phone.

* * * * *